United States Patent [19]
Patterson et al.

[11] Patent Number: 5,765,446
[45] Date of Patent: *Jun. 16, 1998

[54] CONTROL CABLE PRELOAD AND SEALING APPARATUS AND SYSTEM

[75] Inventors: Sam H. Patterson; Frederick K. W. Day; Michael W. Larson; Brian Jordan; Alex Wassmann; Patrick Brady; David J. Zimberoff, all of Chicago; Tyler D. Duston, Evanston, all of Ill.

[73] Assignee: SRAM Corporation, Chicago, Ill.

[*] Notice: The term of this patent shall not extend beyond the expiration date of Pat. No. 5,630,338.

[21] Appl. No.: 698,048

[22] Filed: Aug. 15, 1996

Related U.S. Application Data

[63] Continuation-in-part of Ser. No. 500,774, Jul. 11, 1995, Pat. No. 5,630,338.

[51] Int. Cl.$^6$ .......................................... F16C 1/22
[52] U.S. Cl. ........................ 74/502.4; 74/501.5 R
[58] Field of Search ............... 74/502.4, 502.6, 74/500.5, 501.5 R

[56] References Cited

U.S. PATENT DOCUMENTS

| | | | |
|---|---|---|---|
| 4,889,005 | 12/1989 | Crack | 74/502.4 X |
| 5,102,372 | 4/1992 | Patterson et al. | 74/502.4 X |
| 5,630,338 | 5/1997 | Patterson et al. | 74/502.6 |

*Primary Examiner*—Charles A. Marmor
*Assistant Examiner*—Mary Ann Battista
*Attorney, Agent, or Firm*—Ralph C. Francis

[57] ABSTRACT

A cable preload system and device for providing an axial force to the control cable and sealing the control cable against contamination. The pre-load apparatus includes a braze-on, a cable connector, a resilient tubular member and a frame connector. The cable connector attaches one end of the tubular member to the control cable to form a static seal about the control cable. The frame connector attaches the other end of the tubular member to the frame. The tubular member is adapted to stretch between a first configuration and a second configuration to pre-load the control cable.

5 Claims, 9 Drawing Sheets

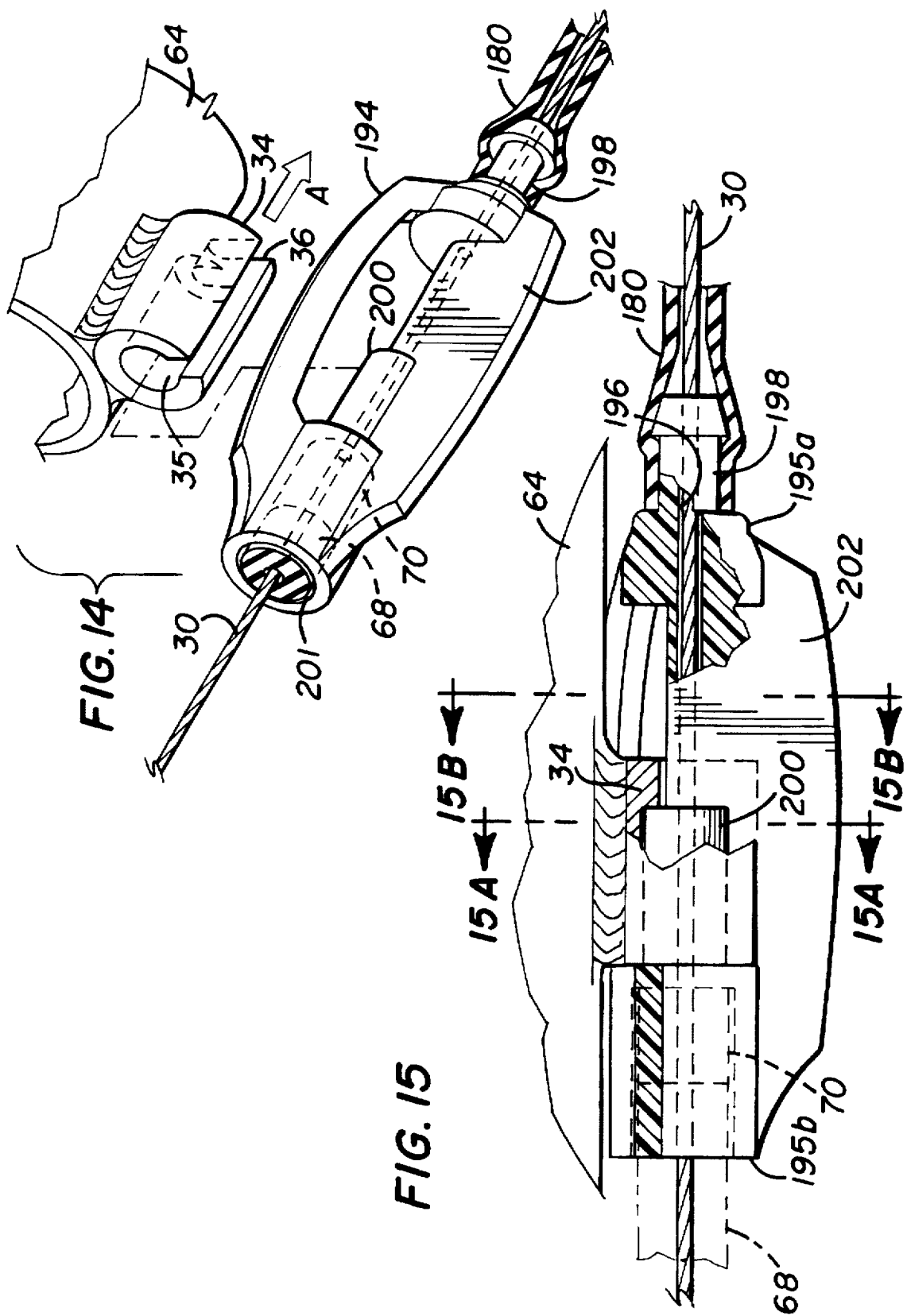

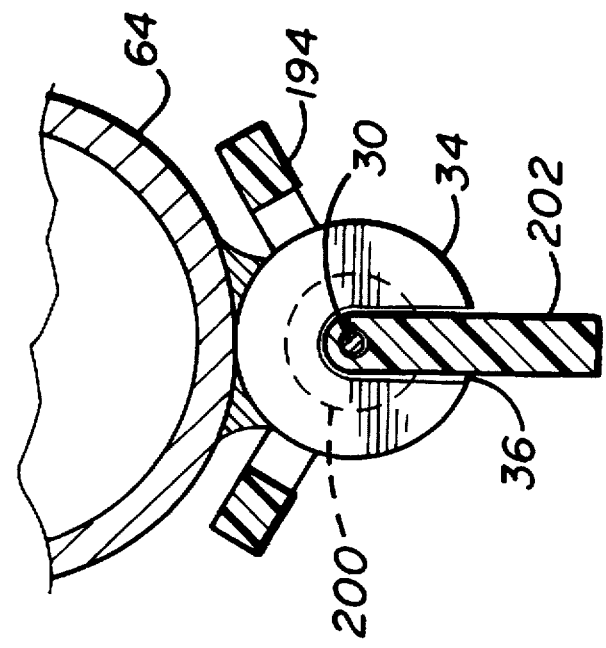
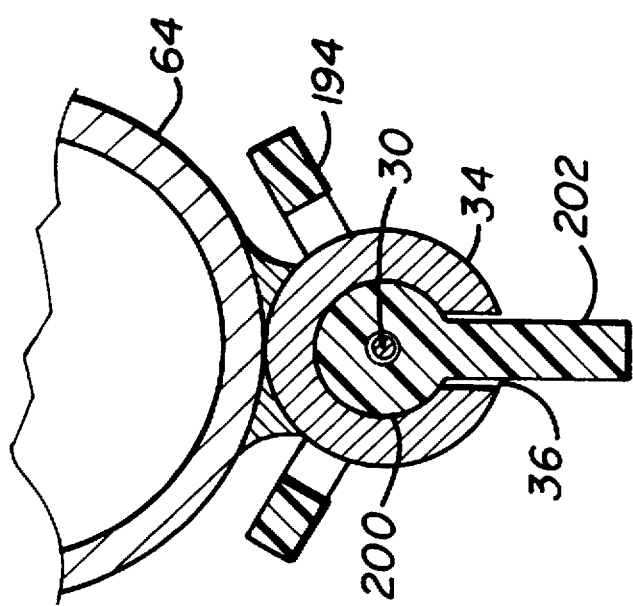

CONTROL CABLE PRELOAD AND SEALING APPARATUS AND SYSTEM

RELATED APPLICATION

This Application is a Continuation-In-Part of U.S. Ser. No. 08/500,774, Filed Jul. 11, 1995, now U.S. Pat. No. 5,630,338.

CROSS-REFERENCE TO RELATED PATENTS

This invention relates to subject matter in U.S. Pat. Nos. 5,197,927; 4,900,291; 4,938,733; and 5,102,372. The disclosure of each related patent is incorporated herein by reference.

BACKGROUND OF THE INVENTION

1. Field of the Invention

This invention relates generally to bicycle gear shift systems having a control cable actuated derailleur. More particularly, this invention relates to a control cable pre-load and sealing apparatus and system for a cable actuated derailleur.

2. Previous Art

Street and mountain bicycles ("mountain bikes") are typically equipped with gear shift systems having multiple gears for optimizing bicycle performance. Such gear shift systems are optimally adapted to operate with a high degree of precision and efficiency so that the time required to shift gears is minimized and bicycle performance is maximized. The gear shift systems typically include a series of freewheel sprockets, front and rear derailleurs, shift actuators and a control cable system.

The control cable system generally includes a central cable having a sheath which covers at least a portion of the control cable. Such control cables are commonly referred to as "Bowden type cables". The control cable is designed to slide axially and reciprocally with respect to the sheath.

In conventional derailleur-activated multiple-gear bikes, the rear derailleur is used to transfer the bicycle drive chain from one freewheel sprocket to another freewheel sprocket. The derailleur moves in response to displacement of the derailleur control cable. Pulling the control cable causes the rear derailleur to shift the drive chain to a larger and more inboard sprocket, producing a lower gear (downshifting). Releasing the control cable permits a cable-tensioning derailleur return spring to shift the drive chain to a smaller and more inboard sprocket, producing a higher gear (upshifting).

Bicyclists optimally desire smooth and rapid gear shifting. Minimizing the time required for shifting is a factor which affects shifting performance. During shifting, optimally, the chain is transferred from central alignment with one sprocket to central alignment with another sprocket. In practice, however, several derailleurs require overshift (i.e., briefly positioning the chain past central alignment of a sprocket during shifting) to move a chain from a smaller sprocket to a larger sprocket.

After overshift, the drive chain is returned to central alignment with the desired sprocket. Several systems have been employed to achieve "overshift return". For example, in some systems, overshift return is accomplished by manual readjustment of the shift actuator. In other systems the shift actuator includes an overshift return mechanism, such as a spring, to release the control cable and, hence, allow the derailleur to move the drive chain into central alignment with the desired sprocket. Details of a highly effective overshift return system are disclosed in U.S. Pat. No. 5,533,937.

During upshifting and overshift return, the control cable also slides axially with respect to the sheath. The cable tension moving the cable in the upshifting direction is limited by the force provided by the derailleur biasing spring. Thus, contamination, such as dirt or moisture, between the cable and the sheath can, and in many instances will, produce undesirable frictional forces. The frictional forces increase the force and time necessary to move the control cable. Accordingly, to optimize performance of the control cable system, it is desirable to minimize such contamination and the resultant frictional forces.

Further, the shift actuator typically produces "overtravel" of the control cable past the actuator detent position corresponding to the target sprocket center. Hysteresis, a common phenomena in shifting systems, is exhibited in the cable linkage due to such factors as cable wire stretch, outer sheath compression, wear and/or excessive tolerances between the end cap and braze-on, end cap cable adjuster nut, and excessive wear and/or tolerances in the derailleur pivots. Since an increase in friction in the derailleur pivot and cable inner wire/sheath contact points increases the tension in the cable, the sheath compression and inner wire stretch will increase proportionally and, hence, increase the hysteresis.

A considerable portion of the cable overtravel produced by the shift actuator will be absorbed by the hysteresis. Overtravel above that which is absorbed by hysteresis will result in overshift at the derailleur. Overtravel at the shift actuator is typically in the range of 0.35 to 0.45 in. on a "high-end" product and up to 0.060 to 0.080 in. for a lower-end (large chain gap compatible) product.

On a new, clean high-end bicycle, system hysteresis absorbs approximately 0.020 in. of overtravel. This typically produces an observable overshift at the derailleur of 0.02 times the actuation ratio (i.e., the amount of derailleur displacement per control cable displacement). Thus, if the actuation ratio is approximately 2:1, the derailleur moves about 0.04 inches past the new sprocket center during a downshift. As the bicycle accumulates dirt (and corrosion) the hysteresis increases to a point where there is no observable overshift. Indeed, observable "undershift" is exhibited if the hysteresis exceeds the overtravel (i.e., overtravel at the shifter, overshift at the derailleur).

On a newer low-end bicycle, the initial overtravel at the shifter is approximately 0.06 to 0.08 in. and the hysteresis is about the same as on a high-end bicycle, approximately 0.02 to 0.03 in. Thus, if the overtravel is approximately 0.06 in. and the hysteresis is approximately 0.02 in., the derailleur would overshift 0.04 times the actuation ratio or approximately 0.08 in.

In operation, it is actually desirable for the derailleur to hesitate in the overshifted position to ensure that the shift occurs. Obviously, this is only important during downshifting. Hesitation, or duration is desirable as long as the derailleur returns to sprocket center reliably after the shift is completed. As the low-end bicycle accumulates dirt and becomes contaminated, the hysteresis increases and absorbs more of the overtravel. It can therefore be seen that there is a need for a device that prevents the hysteresis from increasing due to contamination and assists the derailleur biasing spring in pulling the control cable toward the derailleur for quick upshifting.

Control cable contamination can also cause corrosion of the control cable, further increasing the frictional forces between the control cable and the sheath. In addition, such friction forces will increase control cable wear and can, and in many instances will, cause premature failure of the control cable system.

To reduce control cable contamination, several manufacturers have attempted to seal the entrance of the control cable sheath with a dynamic seal. The dynamic seal typically includes a sheath having end cap and an o-ring. In operation, the o-ring attaches internal to the end cap and circumscribes the control cable. The end cap attaches over the sheath entrance. Dynamic seals have several significant drawbacks. For example, friction is generated between the seal and the internal control cable. Further, movement of the control cable into the sheath can, and in most instances will, carry moisture and dirt into the sheath. A need therefore exists for a means of inhibiting contamination of the control cable while minimizing frictional forces associated with the movement of the control cable.

It is therefore an object of the present invention to provide a control cable pre-load and sealing apparatus and system for use with a bicycle derailleur gear shifting system.

It is another object of the present invention to provide a means for inhibiting contamination of a control cable while minimizing frictional forces associated with the movement of the control cable.

It is yet another object of the present invention to provide a control cable pre-load and sealing apparatus having a minimum number of components and readily adaptable on conventional derailleur-actuated multiple-gear bicycles.

SUMMARY OF THE INVENTION

The control cable pre-load and sealing apparatus and system of this invention achieves positive dynamic sealing of a control cable system. Therefore, there is no friction penalty which normally occurs with a dynamic seal. It also provides a pre-load force on the control cable which enhances shifting performance.

In accordance with objectives and advantages of the present invention, the control cable apparatus comprises a control cable, a control cable sheath adapted to slideably receive the control cable therethrough, a resilient tubular member having first and second ends and adapted to slideably receive the control cable therethrough, a braze-on attachable to a bicycle frame, the braze-on including an engagement portion, a cable connector having a first cable lumen configured to receive the control cable and adapted to engage the first end of the tubular member and the control cable, and a frame connector having a second cable lumen configured to receive the control cable. The frame connector is adapted to engage the second end of the tubular member and includes primary and secondary guides which are adapted to engage the braze-on. In a preferred embodiment, the resilient tubular member is adapted to be elastically stretched between the first and second ends prior to affixing the first end to the cable, whereby a pre-load force is exerted on the cable.

The advantages of the pre-load and sealing apparatus and system include (i) minimal components, (ii) means for providing a pre-load force to a control cable and (iii) means for sealing critical segments of the control cable.

BRIEF DESCRIPTION OF THE DRAWINGS

The foregoing objectives, advantages and features of the invention and those which will be apparent below can be better appreciated after review of the following detailed description, taken in conjunction with the accompanying drawings, in which like parts are given like reference numerals and wherein:

FIG. 14 is a composite view of the frame connector illustrated in FIG. 13 and braze-on, according to the invention;

FIG. 15 is a cross-sectional view of an additional embodiment of a frame connector-braze-on assembly, according to the invention;

FIG. 15A is a cross-sectional view of the frame connector-braze-on assembly taken along plane 15A—15A of FIG. 15; and FIG. 15B is a cross-sectional view of the frame connector-braze-on assembly taken along plane 15B—15B of FIG. 15.

DETAILED DESCRIPTION OF THE INVENTION

The control cable pre-load and sealing apparatus and system of the present invention substantially reduces or eliminates the disadvantages and shortcomings associated with prior art cable systems. As discussed in detail herein, the pre-load and sealing apparatus and system effectively inhibits contamination of the control cable while providing means for pre-loading the control cable.

Figure 1:
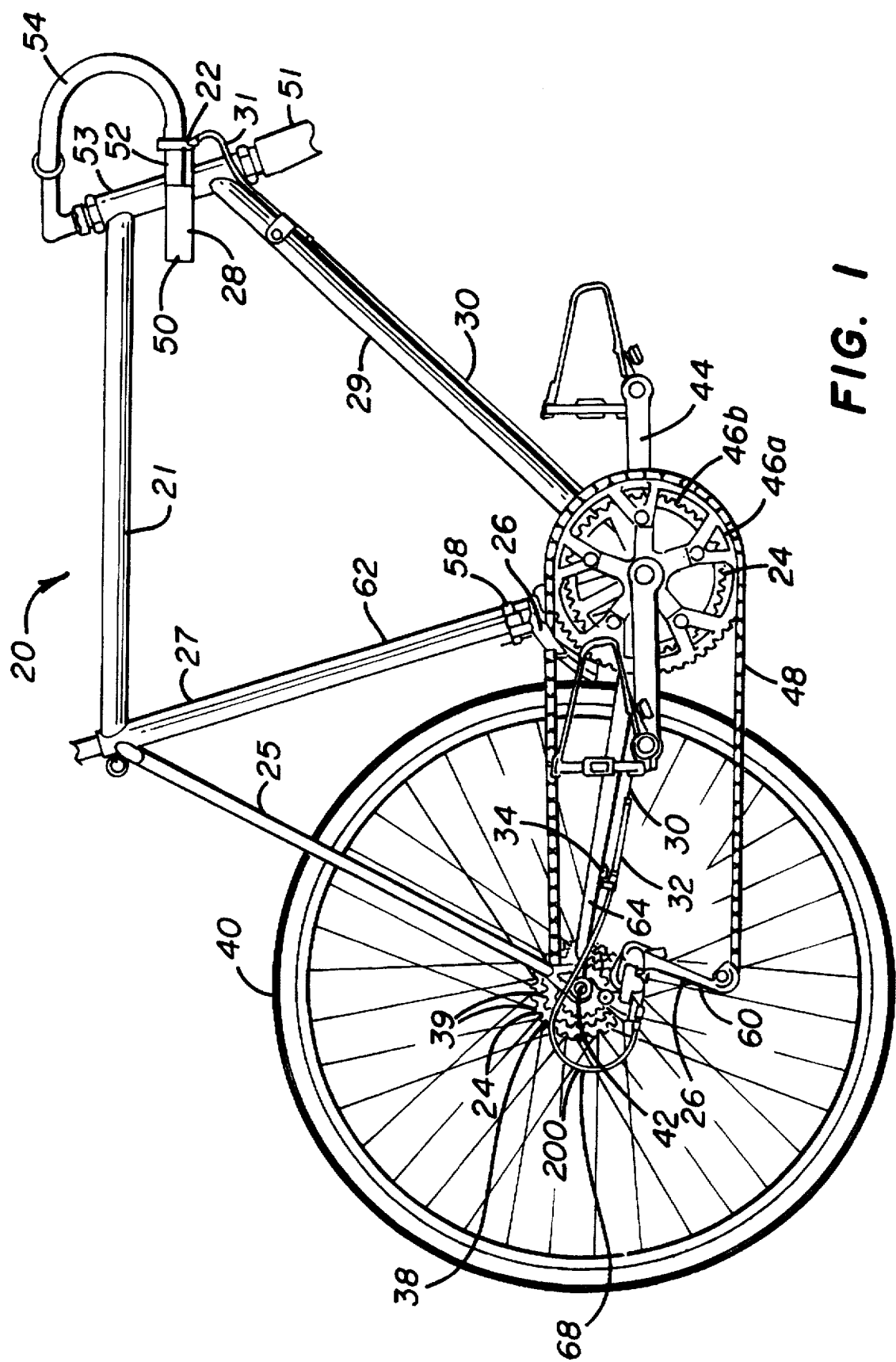
FIG. 1 is an orthogonal view of a bicycle frame employing the present invention.

Referring first to FIG. 1, a bicycle incorporating the invention is indicated generally at 20. Bicycle 20 includes a frame 21 and handlebar 54 inserted into a fork tube 53. The frame 21 includes a chain stay 64 disposed between a crank indicated generally at 44 and a rear hub 24, a seat stay 25 disposed between the hub 24 and the top of a seat tube 27, and a down tube 29, which is disposed between the fork tube 53 and crank 44. Disposed on the end of the handlebar 54 is a static grip 50. Fitting immediately inboard of grip 50 is a hand-rotatable shift actuator 52 by which the rider displaces a control cable 30. The shift actuator 52 can be any of various conventional types; reference is made, for example, to U.S. Pat. Nos. 5,197,927 and 5,102,372 and U.S. Pat. No. 5,524,501 for different kinds of shift actuators. These U.S. patents and pending U.S. Patent application are fully incorporated by reference herein.

The control cable 30, which preferably is a multi-filament alloy or steel cable, is of the Bowden type; that is, portions of it are housed in an outer housing or sheath. For example, the upper end of the cable 30 resides within a housing portion 31. Another cable portion resides within a cable housing 68 near the rear hub 24 of the bicycle 20.

In road bikes, the crank 44 would generally have only two chain rings 46a and 46b. However, in mountain bikes, the crank 44 can have a third chain ring, not shown, and the diameter of the smallest chain ring can be substantially different from that of the largest chain ring 46a.

A freewheel, indicated generally at 38, has a plurality of sprockets 39 which are of various sizes. As in crank 44, when the bicycle 20 is configured as a mountain bike, the sprocket sizes can be substantially different from each other. A conventional bicycle drive chain 48 is routed from a selected one of the chain rings 46a, 46b around the crank 44 to a selected one of the sprockets 39 on the rear of the bicycle 20, allowing the rider to select a gear ratio from a combination of chain ring and sprocket sizes.

The bicycle derailleur, indicated generally at 60, shifts inboard (toward the center line of the bicycle) or outboard (away from the center line of the bicycle) in order to accomplish a shift between different ones of the sprockets 39 within freewheel 38. The derailleur movement is actuated by pulling or releasing the control cable 30. Pulling the cable 30 moves the derailleur inboard in a downshifting direction toward a larger sprocket.

As illustrated in FIG. 1, the bicycle 20 typically includes at least one cylindrical braze-on 34 that attaches to the bicycle frame 21. The braze-on 34 typically comprises a hollow cylinder that is substantially aligned in parallel with the frame chain stay 64.

Figure 4:
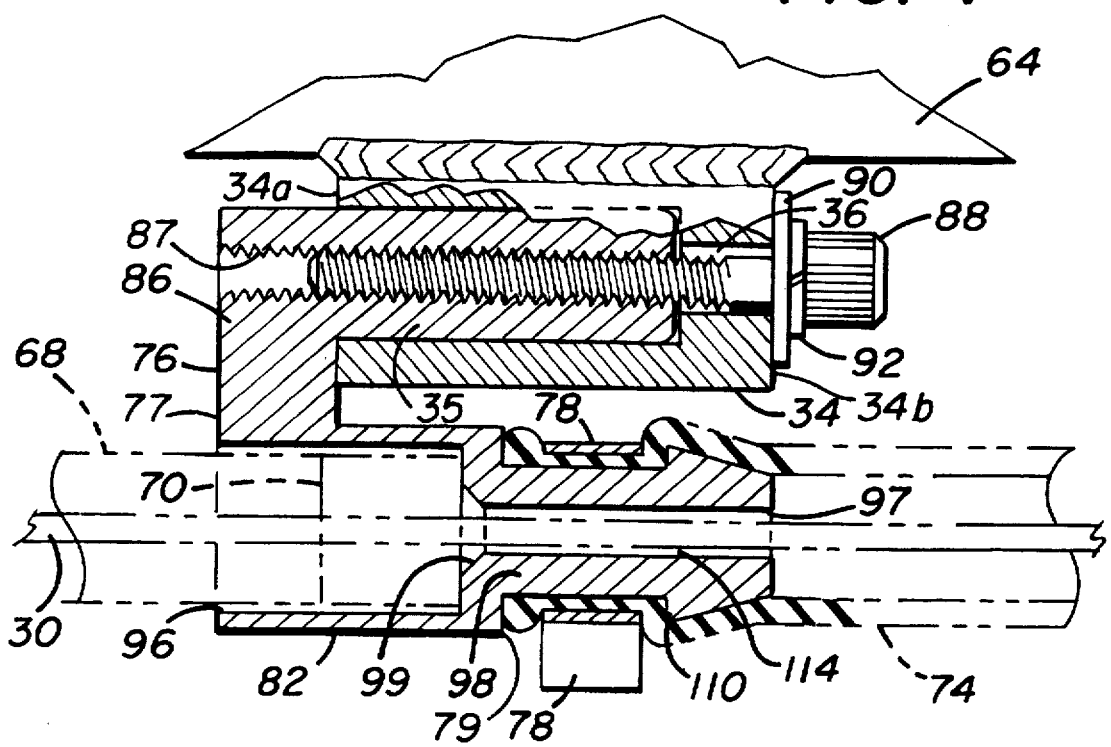
FIG. 4 is a cross-sectional view of a frame connector-braze-on assembly, according to the invention.

As illustrated in FIG. 4, the braze-on 34 includes a cylindrical interior engagement portion 35 (i.e., control cable seat) on one end 34a and a braze-on guide 36 disposed on the opposite end 34b thereof. The guide 36 comprises an elongated slot which is in communication with the braze-on engagement portion 35. (See FIG. 14). The guide 36 is further adapted to receive the control cable 30 and, in the embodiment illustrated in FIG. 4, the bolt 88, therethrough.

As will be appreciated by one having ordinary skill in the art, the braze-on 34 and the engagement portion 35 thereof may comprise different shapes. For example, in additional envisioned embodiments, not shown, the braze-on 34 can comprise an elongated member having a generally square or rectangular shape.

Figure 2:
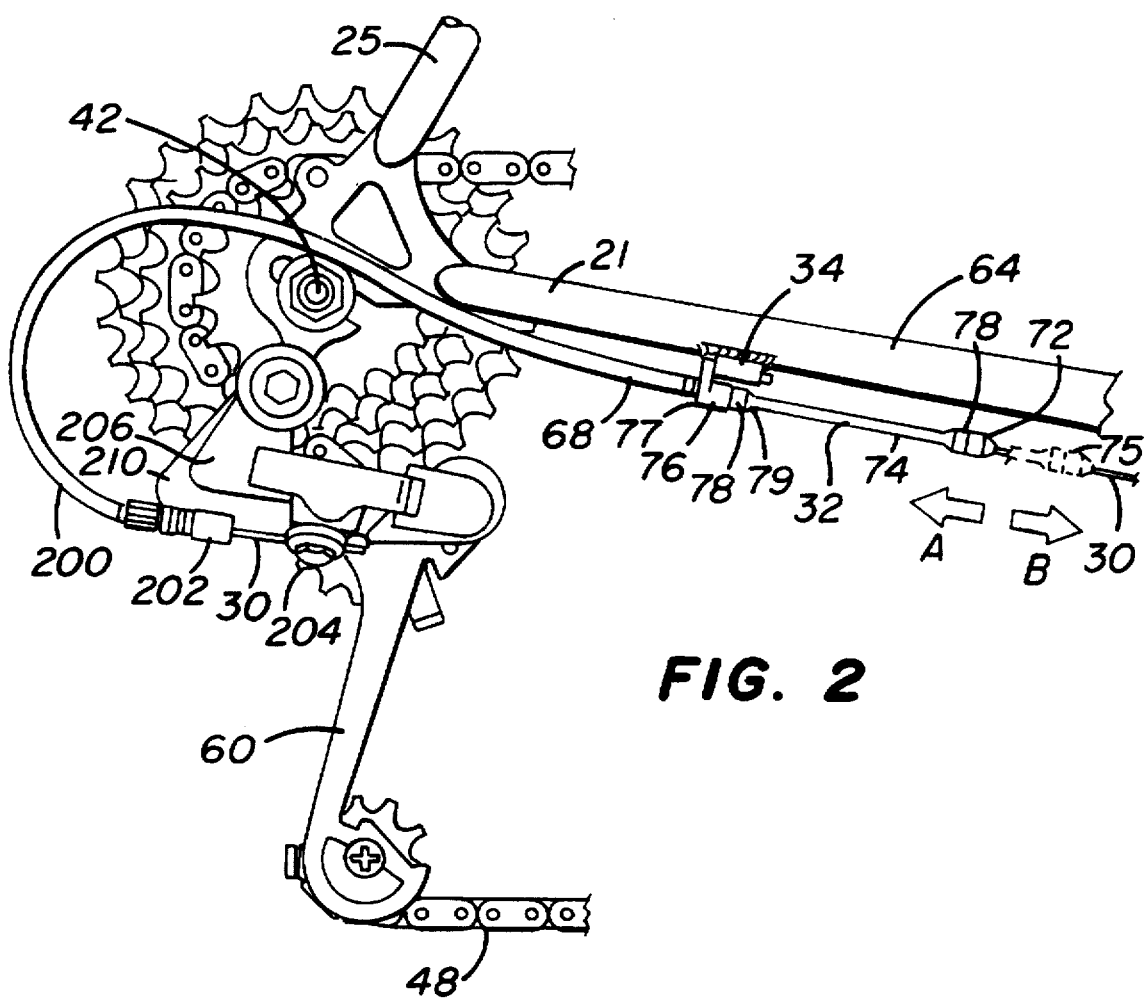
FIG. 2 is an enlarged view of a portion of the bicycle frame of FIG. 1.

Referring now to FIG. 2, there is shown a conventional derailleur system actuated by a cable system 200. The cable system 200 includes a derailleur control cable 30 which is commonly a Bowden type—that is, the cable 30 is contained within a sheath 68 that terminates in a ferrule 202 affixed to the b-knuckle 210. The cable 30 continues to a clamping screw 204 or the like that clamps the cable end to one of the derailleur sideplates such as the outboard sideplate 206. As the cable 30 exits the ferrule 202, the cable 30 is directed in a first direction. The cable 30 is also commonly clamped to the sideplate 206 in a second direction, and this can often be quite different from the first direction depending on how far inboard or outboard the derailleur 60 has been pulled by the cable 30.

As illustrated in FIG. 2, the pre-load and sealing apparatus 32 of the present invention preferably attaches to the chain stay 64 of the bicycle frame 21. According to the invention, the apparatus 32 sealably attaches to the sheath 68 which protects the control cable 30 from damage and contamination.

The pre-load and sealing apparatus 32 includes a control cable connector 72, a tubular member 74 and a frame connector 76. The tubular member 74 and the cable connector 72 are designed and adapted to circumscribe the control cable 30. When the cable connector 72 is secured to the control cable 30 (as discussed in detail below), the cable connector 72 moves in relation to the control cable 30 as indicated by arrows A and B (see FIG. 2).

According to the invention, the tubular member 74 is fabricated from a resilient material to facilitate pre-loading of the control cable 30. By the term "pre-loading" as used herein, it is meant to mean the application of an axial force to the control cable along a plane coincident to the center axis of the control cable.

In a preferred embodiment of the invention, the tubular member 74 is axially resilient and stretches from a first configuration to a second configuration, shown in phantom and indicated generally as 75 (see FIG. 2). Thus, when the tubular member 74 is stretched to the second configuration 75 an axial tensile (i.e., tension) force is produced and exerted upon the control cable 30 by virtue of the resilient tubular member 74 attempting to return to its unstretched length.

As will be recognized by one having ordinary skill in the art, the tubular member 74 can be fabricated from various conventional resilient materials, such as rubber, NEOPRENE®, EPDM, Silicon and Fluorosilicone. In a preferred embodiment, the tubular member 74 comprises a polymerized chloroprene, i.e. NEOPRENE®. Alternatively, the tubular member 74 can include a bellows segment (see FIG. 8) or comprise a coil spring encased in a tubular housing so as to form a bellows.

According to the invention, variable control cable 30 pre-load forces may be achieved by varying the second configuration 75 position. The greater the tubular member 74 is stretched, the greater the pre-load (i.e., tension) force applied to the control cable 30. However, enough elasticity must remain in the tubular member 74 to allow the control cable 30 to move the approximately 0.70 to 1.5 inches which is required to shift the derailleur 60 between its farthest inboard and outboard positions.

Figure 3:
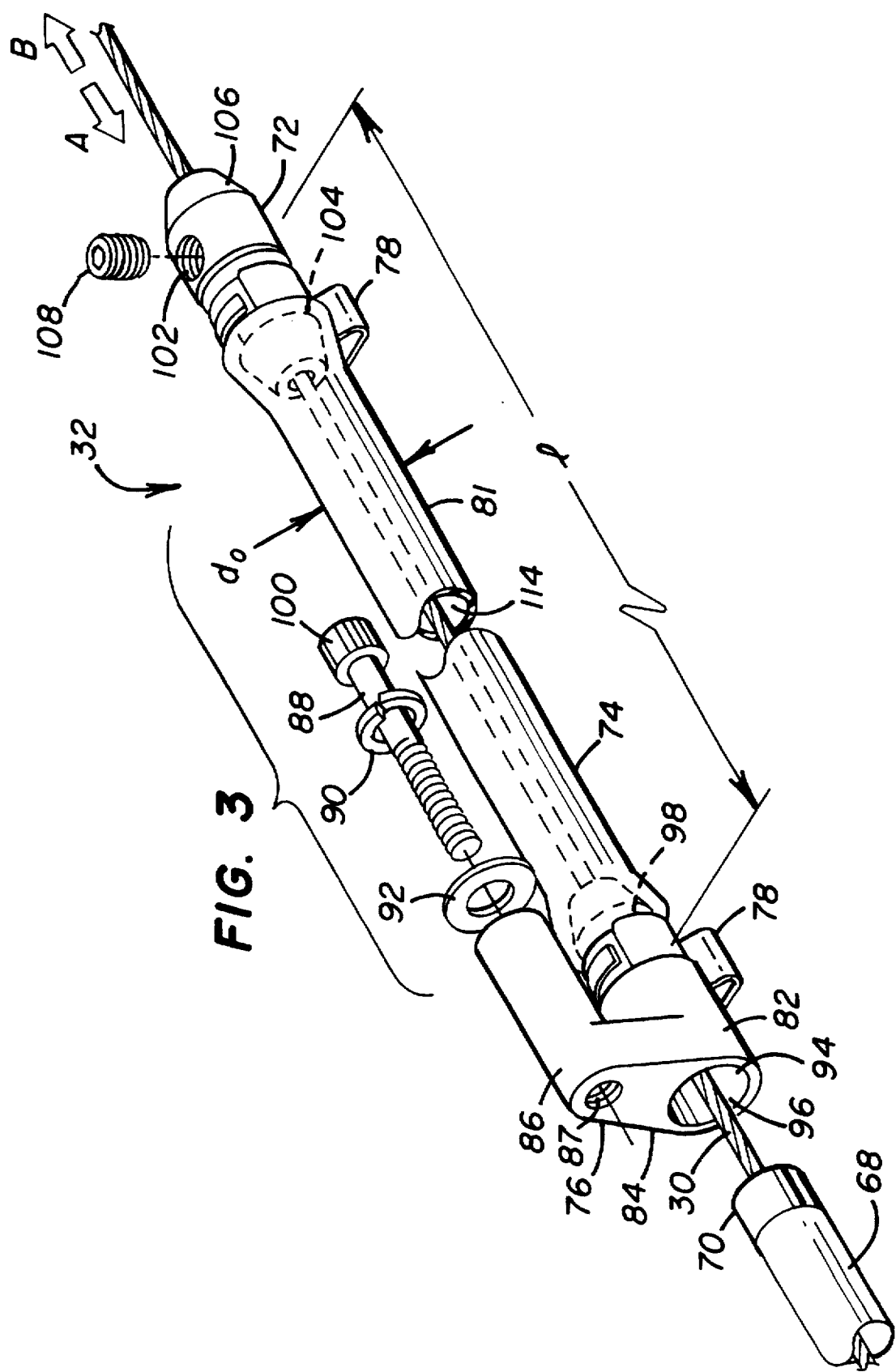
FIG. 3 is a perspective view of the pre-load and sealing apparatus, according to the invention.

Referring now to FIG. 3, the length and the outside diameter of the tubular member 74 is designated by the letters "1" and "$d_o$," respectively. When the resilient tubular member 74 stretches axially, the length "1" increases and the outside diameter "$d_o$" decreases.

In a preferred embodiment, the tubular member 74 has a length "1" within the range of 5–15 centimeters (cm) when the tubular member 74 is in a relaxed state. More preferably, the relaxed length "1" is within the range of 10–13 cm.

In an additional embodiment, the tubular member 74 has an outside diameter "$d_o$" within the range of 0.25–1.0 cm when tubular member 74 is in a relaxed state. Preferably, the tubular member 74 has an outside diameter "$d_o$" within the range of 0.4–1.0 cm when the tubular member is in a relaxed state.

It can be appreciated that the length "1" and the outside diameter "$d_o$" of the tubular member 74 can vary beyond the aforementioned ranges to increase or decrease tension in the tubular member 74. It is, however, desirable to have a tubular member 74 with an outside diameter "$d_o$" within the aforementioned ranges to minimize the risk of failure of the tubular member 74 and to optimize gear shifting performance.

As previously stated, pre-loading the control cable 30 in the manner disclosed herein counteracts various frictional forces between the control cable 30 and the sheath 68 during movement of the control cable 30. Pre-loading the control cable 30 also assists the derailleur 60 when the derailleur 60 draws the control cable 30 through the sheath 68 during upshifting.

Referring now to the embodiment shown in FIG. 2, the tubular member 74 includes a pair of tube clamps 78 disposed on each end thereof The tube clamps 78 are designed and adapted to secure one end of the tubular member 74 adjacent the cable connector 72 to the cable 30 and the other end of the tubular member 74 to the frame connector 76 (see FIG. 3).

As illustrated in FIGS. 2 and 4, the frame connector 76 removably attaches to the braze-on 34 of the bicycle frame 21. One end 77 of the frame connector 76 is adapted to receive the cable sheath 68 (and end cap 70). The other end 79 of the frame connector 76 inserts into and engages the tubular member 74, securing one end of the tubular member 74 stationary with respect to the bicycle frame 21.

Although the pre-load and sealing apparatus 32 is shown attached to the chain stay 64, the apparatus 32 can attach to a control cable 30 and frame at various other desired positions. Such frame positions include the seat tube 62, the forks 51 and other parts of the bicycle frame 21. The pre-load and sealing apparatus 32 can also be used with various other cable actuated systems, such as braking systems.

Referring now to FIG. 3, the pre-load and sealing apparatus 32 further includes a cable lumen 114, which extends through the frame connector 76, the tubular member 74 and the cable connector 72. The control cable 30 extends coaxially through the cable lumen 114.

According to the invention, the pre-load and sealing apparatus 32 is sealably connectable with sheath 68. The sheath 68 includes an end cap 70 that circumscribes an end portion of the sheath 68 and is insertable into the frame connector 76. The end cap 70 includes a cable lumen (not shown) on the front face thereof adapted to receive the control cable 30 therethrough. The cap 70 is preferably fabricated from a rigid corrosion resistant material, such as brass or stainless steel.

As illustrated in FIG. 3, the frame connector 76 includes a housing 82, an outrigger 84, a cylindrical slide 86, a bolt 88, a lock washer 90, a retaining washer 92 and a seal 94. The housing 82 includes a cylindrical interior portion 96 and a neck 98. The interior portion 96 receives and seals the end cap 70 of sheath 68. The seal 94 preferably includes grease inserted between the cylindrical interior 96 and the control cable end cap 70. According to the invention, the neck 98 attaches to the tubular member 74 at one end thereof.

In a preferred embodiment, the cylindrical slide 86 and the housing 82 are formed as an integrated unit. The cylindrical slide 86 is designed and adapted to engage the braze-on 34 engagement portion 35. (See FIG. 4).

The cylindrical slide 86 includes a threaded portion 87 which extends axially through the cylindrical-slide 86 and is adapted to threadably receive the bolt 88. A retaining washer 92 and a lock washer 90 are also provided which circumscribe the bolt 88. The bolt 88 preferably has a head 100 that includes a 2 millimeter (mm) hexagonal impression (not shown) to facilitate rotation of the bolt 88 by a conventional hex wrench.

Referring now to FIG. 4, there is shown the frame connector 76 attached to the bicycle braze-on 34. According to the invention, bolt 88 is inserted through (and positioned by) the braze-on guide 36 and attaches axially with the cylindrical slide 86 to secure the frame connector 76 to the braze-on 34 when the cylindrical slide 86 engages the braze-on 34 engagement portion 35. As illustrated in FIG. 4, the lock washer 90 and retaining washer 92 interpose between the bolt 88 and the cylindrical slide 86. Tightening of the bolt 88 compresses the washers 90 and 92 against the braze-on 34 to lock the cylindrical slide 86 in rigid attachment with the braze-on 34.

As illustrated in FIGS. 3 and 4, the cylindrical interior 96 of the frame connector housing 82 preferably includes a smooth inner surface for receiving the end cap 70 of the sheath 68. The cylindrical interior 96 includes a capillary segment 97, which receives the control cable 30 and guides the control cable 30 with respect to the sheath 68, and a tapered segment 99 formed between the capillary segment 97 and the cylindrical interior 96 (see FIG. 4). The neck 98 of the housing 82 includes lip 110 which is adapted to engage the tubular member 74 when the neck 98 is inserted into tubular member 74. In the noted embodiment, tube clamp 78 circumscribes the tubular member 74 and the connector neck 98 to secure the tubular member 74 to the frame connector 76.

Figure 5:
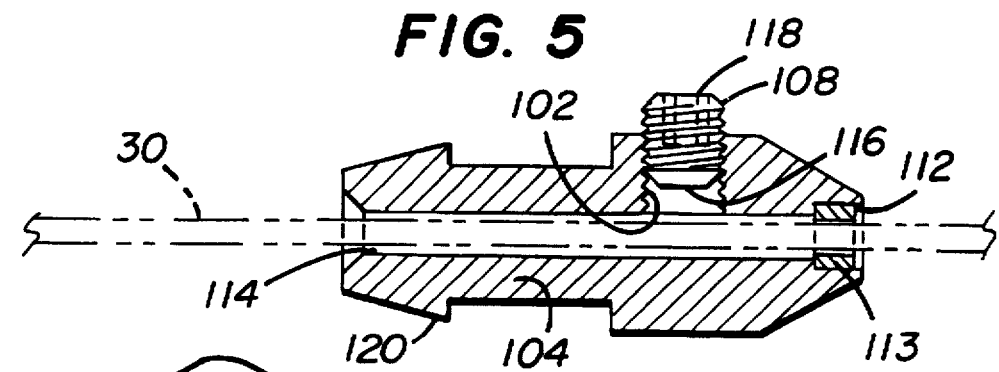
FIG. 5 is a cross-sectional view of a cable connector, according to the invention.

With particular reference to FIG. 5, there is shown the cable connector 72 in accordance with one embodiment of the invention. As stated, the cable connector 72 receives and sealably attaches to the control cable 30.

The cable connector 72 includes a threaded portion 102 disposed on one side thereof, a neck 104, a connector lip 120, a cable seal 112 and a setscrew 108. The set screw 108 is adapted to threadably engage the threaded portion 102 of the cable connector 72 and secure the cable connector 72 to the control cable 30.

As illustrated in FIG. 5, the cable connector neck 104 extends axially from the cable connector 72 to receive an end of tubular member 74. The lip 120 similarly circumscribes the neck 104 to engage tubular member 74 (see FIG. 3).

According to the invention, the cable seal 112 forms a static seal about the control cable 30. The cable seal 112 preferably includes an annular insert 113 and grease disposed between the insert 113 and the cable 30. The annular insert 113 is preferably fabricated out of a conventional elastomeric material.

When the control cable 30 moves, the cable seal 112 moves with the control cable 30 to form a static seal therebetween. It can be appreciated, that various cable seals 112, including to resilient o-rings, may be used accordance with the present invention.

The cable connector setscrew 108 includes a tip 116 and a head 118. The head 118 preferably includes a hexagonal impression for rotation by a conventional 1.5 mm hex key. The set screw tip 116 includes a flat surface which engages the control cable 30 upon rotation of the setscrew 108 and secures the control cable 30 with respect to the cable connector 72. It can be appreciated that any of a number of devices which are capable of securing the cable connector 72 to a control cable may be employed within the scope of this invention.

Figure 6:
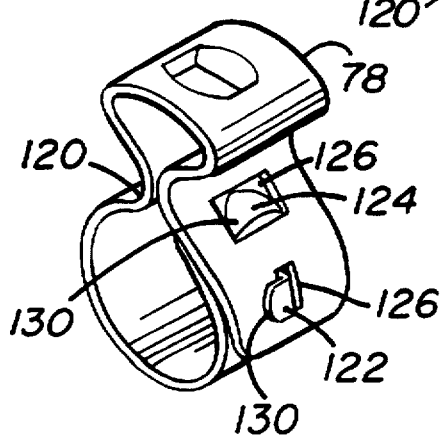
FIG. 6 is a perspective view of a tube clamp, according to the invention.

Referring now to FIG. 6, there is shown a tube clamp 78 in accordance with the invention. The tube clamp 78 includes a tensioner 120, slots 126, a radial lock 124 and an axial lock 122. The tensioner 120 comprises a curved portion of the tube clamp 78 which spring biases the tube clamp 78 in a closed configuration as shown. Each lock 122, 124 includes a protuberance 130 that engages with a respective slot 126. The tensioner 120 biases the tube clamp 78 to uniformly grip a tubular member when the tubular member 74 circumscribes, for example, the neck 98 of connector 72.

Figure 8:
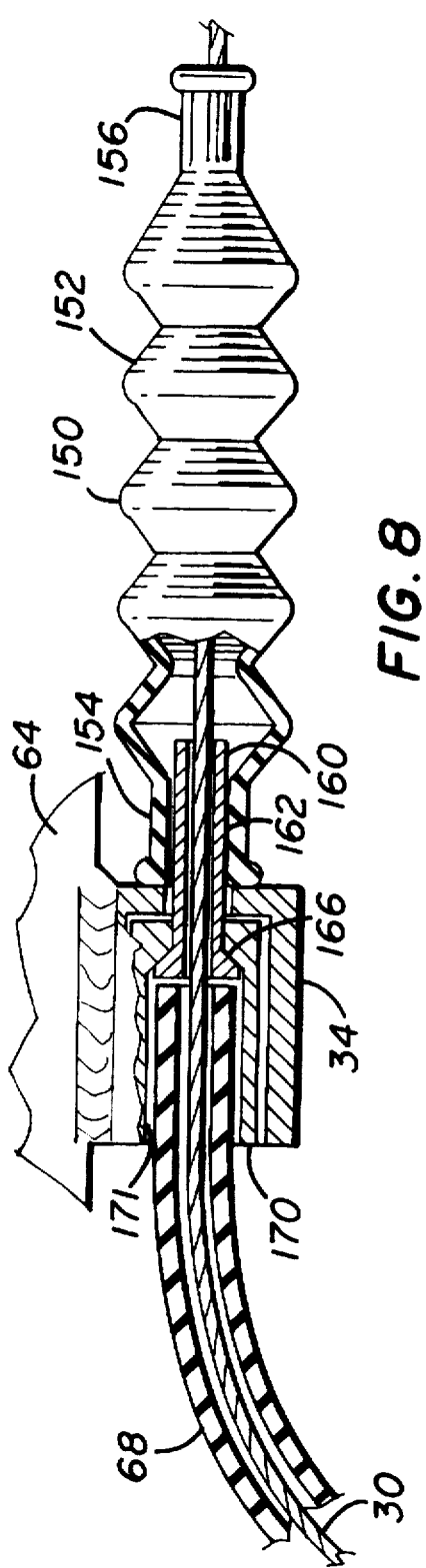
FIG. 8 is an assembled cross-sectional view of the embodiment shown in FIG. 7, according to the invention.

Referring to FIG. 8, there is shown an additional embodiment of the invention. The noted embodiment includes a resiliently deformable tubular member 150 adapted to slideably receive the cable wire 30 therethrough, an end cap 170 and a frame connector 160.

The control cable end cap 170 includes an inner portion 171 adapted to circumscribe one end of the cable sheath 68. The end cap 170 further includes a frame connector lumen 172 adapted to slideably receive the frame connector 160 therethrough (see FIG. 7).

Figure 7:
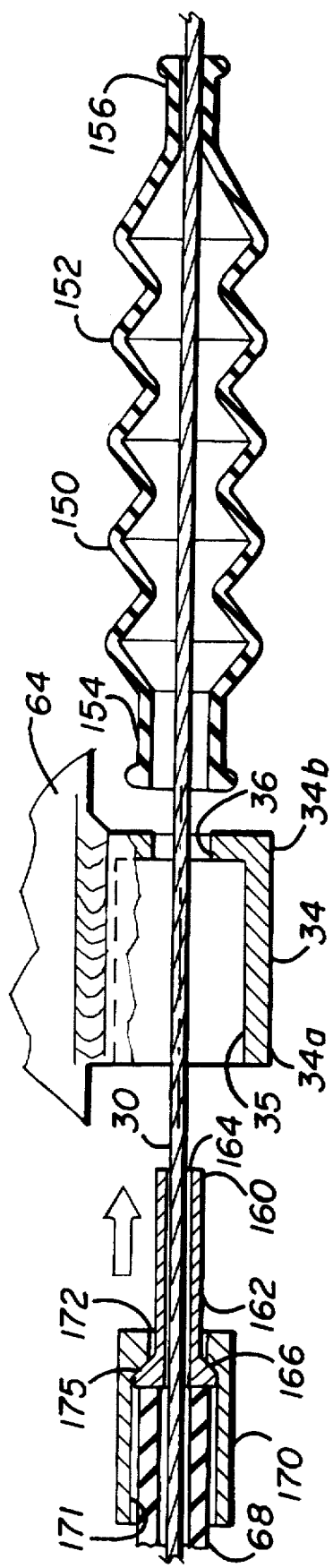
FIG. 7 is a composite cross-sectional view of an additional embodiment of the invention.

As illustrated in FIG. 7, the frame connector 160 of this embodiment includes an elongated capillary tube 162 having a lumen 164 therein adapted to slideably receive the cable wire 30 therethrough. Disposed on one end of the tube 162 is a connector neck 166 adapted to engage and secure the connector 160 within the end cap 170 inner portion 171. In a preferred embodiment, the connector neck 166 engages the end cap inner portion 171 front face 175.

As illustrated in FIGS. 7 and 8, the tubular member 150 comprises a bellows portion 152, a frame connector engagement portion 154 and a cable wire engagement portion 156. The frame connector engagement portion 154 is adapted to slideably receive and secure the frame connector tube 162 therein (see FIG. 8). The cable wire engagement portion 156 is adapted to receive and engage the cable wire 30 therein, whereby axial movement of the cable wire 30 results in elongation of the tubular member 150.

Figure 8A:
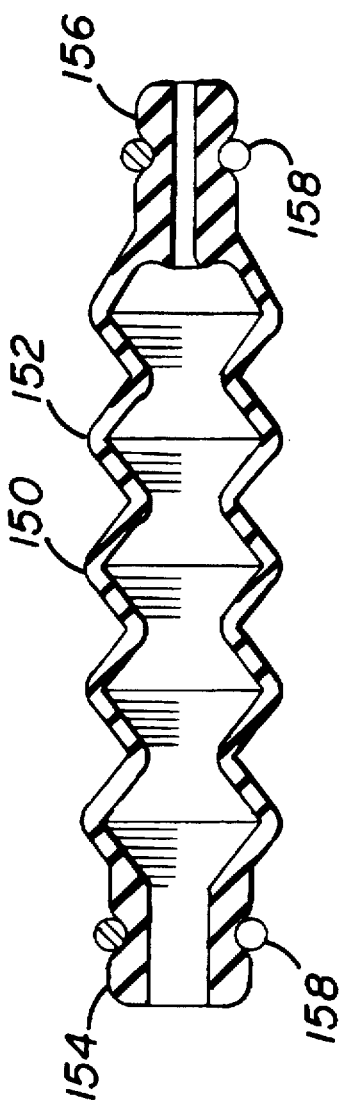
FIGS. 8A and 8B are cross-sectional views of the embodiment shown in FIG. 7, illustrating various clamping means according to the invention.
Figure 8B:
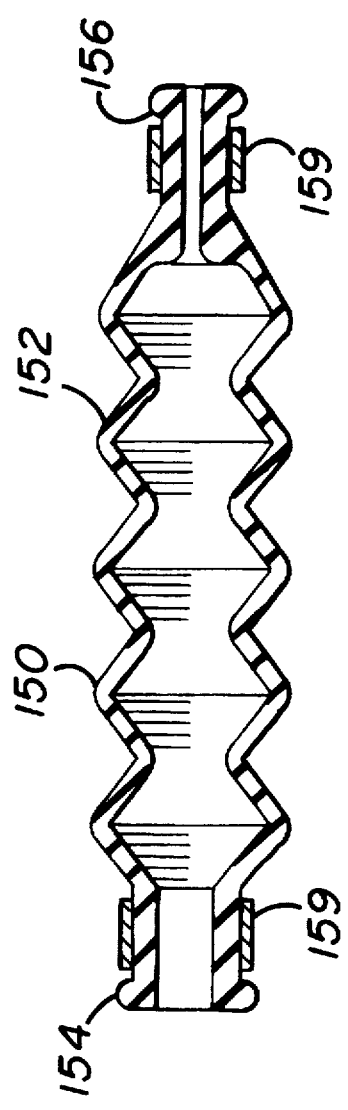
Figure 9:
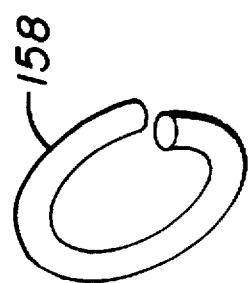
FIG. 9 is a perspective view of the clamping means illustrated in FIG. 8A, according to the invention.
Figure 10:
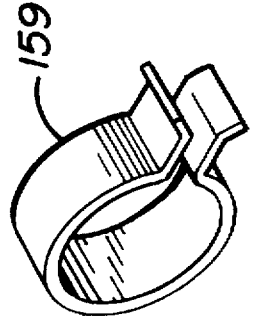
FIG. 10 is a perspective view of the clamping means illustrated in FIG. 8B, according to the invention.

In additional embodiments, as illustrated in FIGS. 8A and 8B, clamping means are provided to enhance the engagement of the frame connector engagement portion 154 and the cable wire engagement portion 156. The clamping means can comprise a pair of snap rings 158 (see FIG. 9) or a pair of clips 159 (see FIG. 10) disposed over each engagement portion 154, 156.

According to the invention, assembly and pre-loading of the control wire 30 are accomplished as follows: The control wire 30 is inserted through the frame connector 160, end cap frame connector lumen 172, braze-on guide 36, and tubular member 150 (see FIG. 7). The connector 160 is positioned in the end cap 170 inner portion 171 and the cap 170 positioned over the cable sheath 68. The assembly 160, 170, 68 is then positioned in the braze-on engagement portion 35 (see FIG. 8).

The tubular member frame connector engagement portion 154 is positioned and secured to the frame connector tube 162. The cable connector engagement portion is then secured to the cable wire 30 at the pre-determined pre-load position (i.e., tubular member pre-load length equal to or greater than free length).

Figure 11:
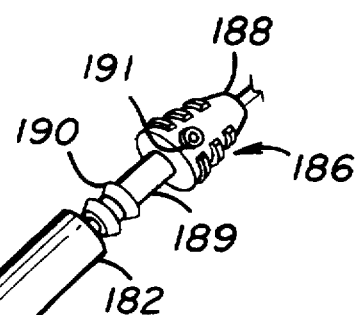
FIG. 11 is a perspective view of an additional embodiment of the invention.

Referring to FIG. 11 there is shown yet another embodiment of the invention. The noted embodiment similarly includes a resilient tubular sealing member 180 adapted to slideably receive the cable wire 30 therethrough, a cable connector 186 and a frame connector 194.

According to the invention, the cable connector 186 and frame connector 194 can be constructed of a light weight, high strength material such as aluminum. DELRON® or NYLON®. In a preferred embodiment, the cable connector 186 is constructed of a synthetic polyamid NYLON®, which has excellent lubricity, and the frame connector 194 is constructed of aluminum.

Figure 12:
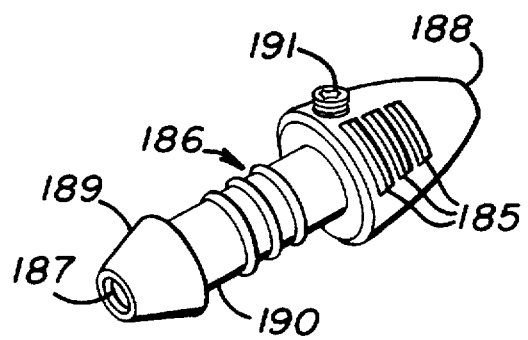
FIG. 12 is a perspective view of an additional embodiment of a cable connector, according to the invention.

As illustrated in FIG. 12, the cable connector 186 includes a cable lumen 187 configured to slideably receive the cable wire 30 therethrough and a plurality of protuberances 185 on the outer surface to facilitate gripping of the connector 186. The connector 186 has two ends 188, 189 with one end 188 of the connector 186 adapted to engage the cable wire 30. The engagement of the cable wire 30 is preferably accomplished by a set screw 191 such as that described above and illustrated in FIGS. 3 and 5.

The opposite end 189 of the cable connector 186 includes a connector neck 190 adapted to slideably engage one end 182 of the tubular member 180 when the neck 190 is inserted into the tubular member 180. According to the invention, the connector 186 is secured to one end 182 of the tubular member 180 by a conventional adhesive, such as LOCK-TITE 40® or SPRAY 80®. The adhesive must of course be compatible with the materials employed to construct the tubular sealing member 180 and the connectors 186, 194.

Figure 13:
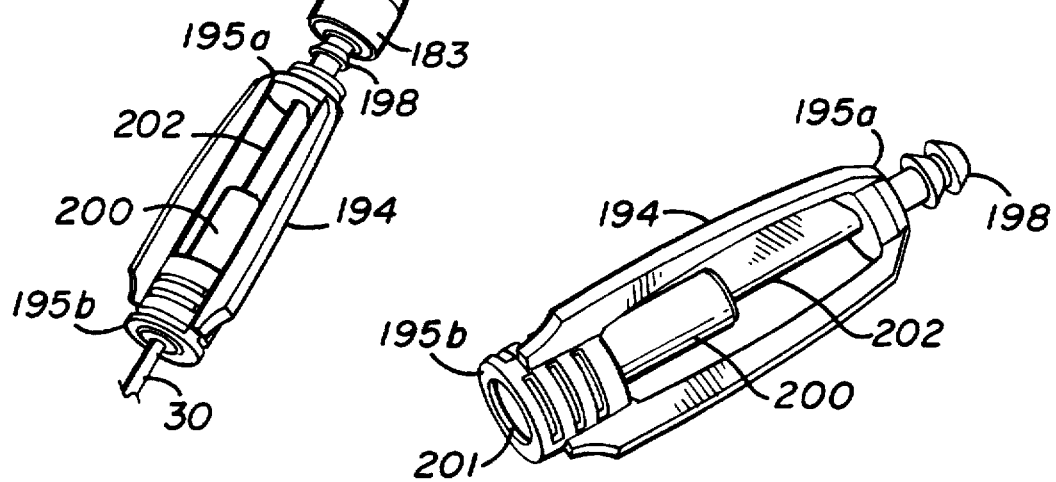
FIG. 13 is a perspective view of an additional embodiment of a frame connector, according to the invention.

As illustrated in FIGS. 13–15, the frame connector 194 similarly includes a cable lumen 196 adapted to slideably receive the cable wire 30 and a frame connector neck 198 disposed on one end 195a thereof which is adapted to slideably engage the opposite end 183 of the tubular member 180 when the neck 198 is inserted into the tubular member end 183. Disposed on the opposite end 195b of the connector 194 is a cable seat 201 adapted to receive the control cable sheath 68 and end cap 70. The frame connector 194 is also secured to the tubular member 180 by a conventional adhesive.

As illustrated in FIG. 14, the frame connector 194 also includes a guide plate 202 (i.e., primary guide) and a cylindrical slide 200 (i.e., secondary guide) preferably in communication therewith. According to the invention, the cable lumen 196 extends through the guide 202 and slide 200.

The connector guide 202 is adapted to slide into and through the braze-on guide 36. As illustrated in FIGS. 15A and 15B, the guide 202 is farther adapted to substantially inhibit rotational movement of the connector 194 when the connector guide 202 is positioned in the braze-on guide 36.

As illustrated in FIG. 15B, the frame connector slide 200 is adapted to slideably engage the braze-on engagement portion 35. As will be appreciated by one of ordinary skill in the art, the slide 200 and braze-on engagement portion 35 can comprise various shapes. Preferably, the connector slide 200 and braze-on engagement portion 35 have a substantially similar generally cylindrical shape.

According to the invention, engagement of the frame connector 194 and the braze-on 34 is as follows: The control wire 30 is inserted through the frame connector 194, tubular member 180 and cable connector 186 assembly. The frame connector guide 202 is then inserted into and through the braze-on guide 36 (see FIG. 14). The connector 194 is then moved forward (in the direction denoted by Arrow A) to position the connector slide 200 in the braze-on engagement portion 35 (see FIG. 15).

After the frame connector 194 is positioned in the braze-on 34, the cable connector 186 is positioned and secured to the cable wire 30 at the predetermined pre-load position.

It will be appreciated by those having skill in the art that the noted embodiment requires minimal components while achieving all of the advantages of the invention. Further, the noted pre-load and sealing apparatus requires little, if any, maintenance.

While the embodiments of the control cable pre-load and sealing apparatus and system have been disclosed with reference to specific structures, one of ordinary skill can make various changes and modifications to the invention to adapt it to various uses and condition. As such, these changes and modifications are properly, equitably, and intended to be, within the full range of equivalence of the following claims.

What is claimed is:

1. A bicycle control cable system for use with a derailleur-actuated multiple-gear bicycle, comprising:

a derailleur attachable to a bicycle frame, said derailleur providing a primary biasing force;

a shift actuator adapted to be operatively affixed to the bicycle;

a control cable disposed between said derailleur and said shift actuator for mechanically interconnecting said derailleur and said shift actuator, said control cable being connected to said derailleur whereby said primary biasing force is substantially applied to said control cable in a first direction;

a braze-on attachable to the bicycle frame, said braze-on being disposed between said derailleur and said actuator; and a resilient deformable preload device having first and second ends, said preload device being disposed between said derailleur and said shift actuator said first end of said preload device being attachable to said braze-on and said second end of said preload device being attachable to said control cable, whereby a preload force is applied to said control cable in said first direction which assists said primary biasing force of said derailleur.

2. The control cable system of claim 1, wherein said preload device is constructed of a polymerized chloroprene.

3. In a bicycle control cable system having a braze-on, derailleur, shift actuator and a control cable operatively connected to said derailleur and said shift actuator, said control cable including a cable wire and a cable sheath encasing a portion of said cable wire, a control cable sealing system, comprising:

a resilient tubular sealing member having first and second ends, said sealing member being adapted to slideably receive said cable wire therethrough;

a cable connector having a first cable lumen configured to slideably receive said cable wire therethrough, said cable connector being adapted to sealably engage said first end of said tubular sealing member and said cable wire; and a frame connector having a second cable lumen configured to slideably receive said cable wire, said frame connector adapted to sealably engage said second end of said tubular sealing member and said braze-on.

4. The control cable system of claim 3, wherein said cable connector is constructed of a synthetic polyamid.

5. The control cable system of claim 3 wherein said frame connector is constructed of aluminum.

* * * * *